(12) United States Patent
Nakano (10) Patent No.: US 6,915,207 B2
(45) Date of Patent: Jul. 5, 2005

(54) METHOD AND SYSTEM FOR SETTING TRAVEL TIME AND METHOD AND SYSTEM FOR ROUTE CALCULATION WITH USE THEREOF

(75) Inventor: Toshiaki Nakano, Tokyo (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 10/013,346

(22) Filed: Dec. 13, 2001

(65) Prior Publication Data

US 2002/0077748 A1 Jun. 20, 2002

(30) Foreign Application Priority Data

Dec. 20, 2000 (JP) ........................................ 2000-387437

(51) Int. Cl.[7] ............................................. G01C 21/00
(52) U.S. Cl. ..................... 701/209; 701/201; 701/204; 701/213; 340/988; 340/995.23; 455/456.1
(58) Field of Search ................................. 701/200, 201, 701/204, 213, 206–211, 300; 340/988–994, 905, 933, 934, 936, 995.23; 455/456.1, 456.3, 456.5

(56) References Cited

U.S. PATENT DOCUMENTS

| | | | | |
|---|---|---|---|---|
| 4,350,970 A | * | 9/1982 | von Tomkewitsch | 340/989 |
| 5,177,685 A | * | 1/1993 | Davis et al. | 701/209 |
| 5,539,645 A | * | 7/1996 | Mandhyan et al. | 340/905 |
| 5,657,010 A | * | 8/1997 | Jones | 701/117 |
| 6,012,012 A | * | 1/2000 | Fleck et al. | 701/117 |
| 6,150,961 A | * | 11/2000 | Alewine et al. | 340/995.1 |
| 6,178,374 B1 | * | 1/2001 | Mohlenkamp et al. | 701/117 |
| 6,182,009 B1 | * | 1/2001 | Brocke et al. | 701/209 |
| 6,191,708 B1 | * | 2/2001 | Davidson | 701/204 |
| 6,236,933 B1 | * | 5/2001 | Lang | 701/117 |
| 6,341,255 B1 | * | 1/2002 | Lapidot | 701/209 |
| 6,421,606 B1 | * | 7/2002 | Asai et al. | 701/209 |
| 6,424,910 B1 | * | 7/2002 | Ohler et al. | 701/202 |
| 6,449,555 B1 | * | 9/2002 | Ohba et al. | 701/201 |
| 6,628,233 B2 | * | 9/2003 | Knockeart et al. | 342/357.1 |
| 2001/0047242 A1 | * | 11/2001 | Ohta | 701/210 |

FOREIGN PATENT DOCUMENTS

| | | |
|---|---|---|
| EP | 0 292 897 | 11/1988 |
| EP | 0 880 120 | 11/1998 |
| EP | 0 953 825 | 11/1999 |
| WO | WO 98/15935 | 4/1998 |

* cited by examiner

Primary Examiner—Tan Q. Nguyen
(74) Attorney, Agent, or Firm—Arent Fox (57) ABSTRACT

A position of a vehicle is detected by receiving a position detection signal transmitted from the travelling vehicle. It is sensed whether or not the vehicle passes a starting node of a required link on a road network, and when the vehicle passes the starting node, the passing time is stored. Then, it is also sensed whether or not the vehicle passes an end node of the required link on the road network, and when the vehicle passes the end node, the passing time is stored. Then, a travel time for the link is calculated from the passing times of passing the respective starting and end nodes of the link.

10 Claims, 3 Drawing Sheets

METHOD AND SYSTEM FOR SETTING TRAVEL TIME AND METHOD AND SYSTEM FOR ROUTE CALCULATION WITH USE THEREOF

BACKGROUND OF THE INVENTION

1. Field of the Invention

This invention relates to a method for setting in advance a travel time in a required section of road on a passage route and a system for implementing the method, and also a method and a system of performing route calculation for navigation or the like using the method of setting the travel time.

2. Description of the Related Art

Recent years, navigation systems for guiding a conveyance such as an automobile to a destination desired by a user are becoming widely available.

The navigation system calculates a route connecting a starting location and a destination location based on requirements established by a user, and guides the user along a route determined by the resulting route calculation. The user can establish various requirements, e.g., distance priority, kinds of roadways making up the route such as a national road, toll road and expressway/motorway, use or non-use of a ferry boat, and traffic restrictions, for allowing the desired route calculation to be done.

However, the route calculation in the navigation system as described above does not conventionally involve actual traffic situations such as a traffic jam. If the route calculation is done on the basis of the requirement, for example, of the shortest route or of use of an expressway/motorway, the automobile may not always arrive at the destination location in the minimum time. There may be a situation in which the automobile is caught in a traffic jam on the way and much more time is required for travelling to the destination location than that required for travelling along an alternative route that includes a detour.

It has been supposed that in order to arrive at the destination location in the minimum time, the time for travelling a required section of road on the route should be set in advance for making the route calculation involving the set travel time.

However, the traffic situation varies every moment and differs according to the time of day. If the route calculation is made involving a travel time assumed across the board, the route calculation is not always made in line with the actual condition.

Accordingly, it is impossible to solve the aforementioned problem.

SUMMARY OF THE INVENTION

The present invention has been made to solve the above problems associated with the route calculation conventionally made in a navigation system or the like as described above.

It is therefore a first object of the present invention to provide a method allowing a travel time to be set in conformity with the actual traffic situation for use it in route calculation for a car navigation system or the like.

It is a second object of the present invention to provide a system for implementing the above method for setting the travel time.

It is a third object of the present invention to provide a method of calculating a route using the above method for setting the travel time.

It is a fourth object of the present invention to provide a system of calculating a route using the above method for setting the travel time.

To attain the first object, a method for setting a travel time according to a first aspect of the present invention has the feature of including the steps: receiving a position detection signal transmitted from a travelling vehicle to detect a position of the vehicle; sensing whether or not the vehicle passes a starting node of a required link on a road network for storage the passing time when the vehicle passes the starting node; sensing whether or not the vehicle passes an end node of the required link on the road network for storage of the passing time when the vehicle passes the end node; and calculating a travel time for the link from the passing times at the starting node and the end node of the link.

With the method for setting the travel time according to the first aspect, by receiving a position detection signal indicating the vehicle position which is transmitted via a mobile communication network from the travelling vehicle fitted with a navigation system or the like having communication facility, it is monitored whether or not the vehicle subjected to the position detection passes each of starting and end nodes of a link, subjected to measurement, on a road network. When the vehicle subjected to the position detection passes both the starting and end nodes of the link subjected to the measurement on the road network, each of the times passing the respective starting and end nodes is detected and stored.

Then, the time required to travel the link connecting the starting node and the end node is calculated from the detected passing times.

As described above, according to the first aspect, the travel time in each of the links making up the road network is set based on the position detection signal transmitted from the vehicle which has actually travelled the link. This method achieves the setting of the travel time matching the actual traffic situations including a traffic jam and the like as compared with a travel time assumed through a calculation from road data of a distance and the like.

If the travel time data for each link on the road network set by the present invention is used as reference data in route calculation in a navigation system for example, proper route calculation is made in conformity to actual traffic situations.

If the travel time data set by the present invention is used as traffic information, it is further possible to provide proper traffic information, and therefore to expect the effects of relieving traffic congestion.

To attain the first object, the method for setting the travel time according to a second aspect of the present invention has the feature, in addition to the configuration of the first aspect, that the step of calculating the travel time is performed in each required time slot.

With the method for setting the travel time according to the second aspect, the setting of the travel time in each link of the road network based on the position detection signal transmitted from the travelling vehicle, is performed separately in given time slots, for example, the time slots of morning, afternoon and night or the time slots of the commuting hours in morning and evening and other time slots. Such setting allows the travel time to be set so as to conform more closely to the actual traffic situations.

Further, if the time slot is set to be shorter, it is possible to set a travel time much more closely conforming to the actual traffic situations.

To attain the first object, the method for setting the travel time according to a third aspect of the present invention has the feature, in addition to the configuration of the second aspect, that in the step of calculating the travel time, the travel time is calculated by averaging a plurality of data representing the travel times of the vehicles detected within the required time slot.

With the method for setting the travel time according to the third aspect, for the setting of the travel time, a plurality of the travel times are averaged on the basis of travel times which are detected from the plurality of vehicles passing the link to be measured within the required time slot.

Hence, comparing with the case in which a travel time detected from a single vehicle is set directly as a travel time for a link, adjustments are made for variations in the travel times caused by individual circumstances produced in the vehicles, resulting in setting a more correct travel time conforming to the actual traffic situations.

To attain the first object, a method for setting a travel time according to a fourth aspect of the present invention has the feature, in addition to the configuration of the third aspect, of further including a step of calculating a travel time in the link from road data and a set speed instead of the travel time measured when the number of data representing the travel times of the vehicles detected within the required time slot is lower than a specified number set in advance.

With the method for setting the travel time according to the fourth aspect, in setting the travel time, if the number of vehicles subjected to the detection of the travel time within the required time slot does not reach the specified number set in advance, the travel time is assumed on the basis of the known road data, i.e. the distance of a link, the width of a road, the number of lanes, kinds of road such as an expressway/motorway or an ordinary road, speed limits, and so on, instead of using the data of the travel times obtained from the detection.

Hence, the travel time is allowed to be set even if no vehicle passes within the time slot subjected to the measurement. Further, if the number of vehicles passing is below the specified number, it is possible to exclude the influence of an extension of the travel time caused by individual circumstances, e.g. a failure, produced in the vehicles, for example.

In this event, due to the smaller number of vehicles travelling in the time slot and the low possibility of a traffic jam occurring for example, there is no great difference from the actual travel time, resulting in setting a travel time matching actual conditions.

To attain the first object, a method for setting a travel time according to a fifth aspect of the present invention has the feature, in addition to the configuration of the first aspect, of further including a step of calculating an average speed per hour from the calculated travel time and the distance of the link.

With the method for setting the travel time according to the fifth aspect, since the distance of each of the links making up the road network is known, the average speed per hour of the vehicles in the link is calculated from the measured travel time, to be used as reference data for the provision of traffic information or route calculation in navigation.

To attain the first object, a method for setting a travel time according to a sixth aspect of the present invention has the feature, in addition to the configuration of the first aspect, of further including a step of storing data representing the calculated travel time through an overwriting operation.

Hence, the data on the travel time in each of the links making up the road network is updated to latest data at all times, to be made available for use.

To attain the second object, a system for setting a travel time according to a seventh aspect of the present invention has the feature of including: vehicle-position detection means for receiving a position detection signal transmitted from a travelling vehicle to detect a vehicle position; node-passing-time detection means for sensing from the position detection of said vehicle-position detection means whether or not the vehicle passes a required node on a road network, to detect the node-passing time of the vehicle; and travel-time calculation means for calculating a travel time in a link connecting the two required nodes from the node passing times of the vehicle passing the two required nodes on the road network which are detected by the node-passing-time detection means.

On the system for setting the travel time according to the seventh aspect, the vehicle-position detection means receives a position detection signal indicating the vehicle position which is transmitted via a mobile communication network from the travelling vehicle fitted with a navigation system or the like having communication facility. The node-passing-time detection means monitors whether or not the vehicle subjected to the position detection passes each of the starting and end nodes of the link, subjected to the measurement, on the road network. Upon sensing that the vehicle has passed both the starting and end nodes of the link subjected to the measurement on the road network, the node-passing-time detection means detects the passing times for storage.

Then, the travel-time calculation means calculates the time required to travel the link connecting the starting node and the end node from the above passing times at the respective starting and end nodes, and sets the results as the travel time in the corresponding link.

In this way, according to the seventh aspect, the travel time regarding each of the links making up the road network is set on the basis of the position detection signal transmitted from the vehicle actually travelling the link. For this reason, as compared with a value calculated from the road data of a distance and others, the system is able to set the travel time in conformity with the actual traffic situations including traffic congestion and the like.

Further, if the data of the travel time in each link of the road network which is set by the present invention is used as reference data for route calculation in the navigation system for example, a proper route is calculated in conformity with the actual traffic situations.

Still further, if the data of the travel time set by the present invention is used as traffic information, proper traffic information is provided.

To attain the second object, the system for setting the travel time according to an eighth aspect of the present invention has the feature, in addition to the configuration of the seventh aspect, that the travel-time calculation means calculates the travel time for each required time slot.

With the system for setting the travel time according to the eighth aspect, the travel-time calculation means performs the setting of the travel time in each link of the road network based on the position detection signal transmitted from the travelling vehicle, in separate given time slots, for example, the time slots of morning, afternoon and night or the time slots of the commuting hours in morning and evening and other time slots.

This configuration allows the travel time to be set in more conformity with the actual traffic situations.

Further, if a time slot is set to be shorter, it is possible to set the travel time much more closely matching the actual traffic situations.

To attain the second object, the system for setting the travel time according to a ninth aspect of the present invention has the feature, in addition to the configuration of the eighth aspect, that the travel-time calculation means averages a plurality of data representing the travel times of the vehicles detected within the required time slot for calculating the travel time.

With the system for setting the travel time according to the ninth aspect, the travel-time calculation means averages a plurality of travel times based on the travel times detected from a plurality of vehicles which pass the link, subjected to the measurement, within the required time slot for the setting of the travel time.

Hence, comparing with the case in which a travel time detected from a single vehicle is set directly as a travel time for a link, adjustments are made for variations in the travel times caused by individual circumstances produced in the vehicles, resulting in setting a more exact travel time to match the actual traffic situations.

To attain the second object, the system for setting the travel time according to a tenth aspect of the present invention has the feature, in addition to the configuration of the ninth aspect, that the travel-time calculation means calculates the travel time in the link from road data and a set speed instead of the detected node passing time when the number of data representing the travel times of a plurality of the vehicles detected within the required time slot is lower than a specified number set in advance.

With the system for setting the travel time according to the tenth aspect, in the setting of the travel time, when the number of vehicle subjected to detection for the travel time within the required time slot does not reach the specified number set in advance, the travel-time calculation means calculates the travel time on the basis of the known road data, i.e. the distance between the nodes, the width of a road, the number of lanes, kinds of road such as a expressway/motorway or an ordinary road, speed limits, and so on, instead of using the data of the travel times obtained through the detection.

Hence, the travel time is allowed to be set even if no vehicle passes within the time slot subjected to the measurement. Further, when the number of vehicles passing is below the specified number, it is possible to exclude the influence of an extension of the travel time caused by individual circumstances, e.g. a failure, produced in the vehicles, for example.

In this event, due to the smaller number of vehicles travelling in the time slot and the low possibility of a traffic jam occurring for example, there is no great difference from the actual travel time, resulting in setting a travel time matching actual conditions.

To attain the second object, the system for setting the travel time according to an eleventh aspect of the present invention has the feature, in addition to the configuration of the seventh aspect, of further including speed-per-hour calculation means for calculating an average speed per hour from the travel time calculated by the travel-time calculation means and the distance of the link.

With the system for setting the travel time according to the eleventh aspect, since the distance of each of the links making up the road network is known, the speed-per-hour calculation means calculates the average speed per hour of the vehicles in the link from the measured travel time, to be used for the provision of traffic information or route calculation in navigation.

To attain the second object, the system for setting the travel time according to a twelfth aspect of the present invention has the feature, in addition to the configuration of the seventh aspect, of further including travel-time data storage means for storing data representing the travel time calculated by the travel-time calculation means.

With the system for setting the travel time according to the twelfth aspect, the data of the travel time for each of the links making up the road network is stored in the travel-time data storage means, and is read out from the travel-time data storage means to be used as the reference data for the provision of traffic information or route calculation for navigation.

To attain the second object, the system for setting the travel time according to a thirteenth aspect of the present invention has the feature, in addition to the configuration of the twelfth aspect, that the travel-time data storage means stores the data representing the travel time through an overwriting operation.

With the system for setting the travel time according to the thirteenth aspect, the data regarding the travel time in each of the links making up the road network is updated to the latest data at all times for storage in the travel-time data storage means.

This allows the provision of traffic information regarding the travel time most closely matching the actual conditions.

To attain the third object, a method for route calculation according to a fourteenth aspect of the present invention has the feature of including the steps of: detecting node-passing times of a vehicle passing two required nodes on a road network on the basis of vehicle positions detected by position detection signals transmitted from the travelling vehicle; calculating a travel time in a link connecting the two nodes from the detected node-passing times for storing the calculated data for each link on the road network; and calculating a route connecting a set starting location and a set destination location on the basis of the stored travel time data.

With the method for the route calculation according to the fourteenth aspect, through reception of a position detection signal indicating the vehicle position which is transmitted via mobile communication network from the travelling vehicle fitted with a navigation system or the like having communication facility, it is monitored whether or not the vehicle subjected to the position detection passes each of the two required nodes on the road network. When the vehicle subjected to the position detection passes both the starting and end nodes of a link subjected to the measurement on the road network, the times of passing the respective starting and end nodes are detected and stored. Then, the time required for the vehicle to travel the link connecting the two nodes is calculated from the stored times of passing the two nodes, and is stored for each of the links making up the road network.

In the navigation system, when the starting and destination locations are entered and a route is calculated for connecting them in a minimum time for example, the above stored travel time data for each of the links making up the road network is read for use as the basic data in the route calculation.

As described above, according to the fourteenth aspect, in making the route calculation subject to the conditions of the travel time in the navigation system, the route is calculated based on the travel time data for each of the links of the road network which is set based on the position detection signal transmitted from the vehicle which has actually traveled.

Hence, the method achieves route calculation matching the actual traffic situations, e.g. traffic congestion, as compared with route calculation based on an assumed travel time calculated from the road data of the distance and the like.

Through the route calculation matching the actual conditions in this way, the effect of relieving traffic congestion is also to be expected.

To attain the third object, the method for the route calculation according to a fifteenth aspect of the present invention has the feature, in addition to the configuration of the fourteenth aspect, that the step of calculating the travel time is performed in each required time slot, and the step of calculating the route connecting the set starting location and the set destination location is performed based on the travel time data for the corresponding time slot.

With the method for the route calculation according to the fifteenth aspect, the setting of the travel time in each of the links of the road network is performed separately in given time slots, for example, the time slots of morning, afternoon and night or the time slots of the commuting hours in morning and evening and other time slots. Then, the route calculation subject to the condition of the travel time in the navigation system is performed with reference to the data of the travel time corresponding to the time slot in which the route to be set through this route calculation will be used.

Thus, a route more closely conforming to the actual traffic situations is set.

To attain the third object, the method for the route calculation according to a sixteenth aspect of the present invention has the feature, in addition to the configuration of the fifteenth aspect, that in the step of calculating the travel time, the travel time is calculated by averaging a plurality of data representing the travel times of the vehicles detected within the required time slot, and the step of calculating the route connecting the set starting and destination locations is performed on the basis of the averaged travel-time data for the corresponding time slot.

With the method for the route calculation according to the sixteenth aspect, on the basis of the travel times detected from a plurality of vehicles which pass the link subjected to the measurement within the required time slot, the plurality of the travel times are averaged for setting the travel time which is to be a reference in the route calculation in the navigation system.

Hence, comparing with the case in which a travel time detected from a single vehicle is set directly as a travel time for a link, adjustments are made for variations in the travel times caused by individual circumstances produced in the vehicles, resulting in performing the route calculation in more conformity with the actual traffic situations.

To attain the third object, the method for the route calculation a route according to a seventeenth aspect of the present invention has the feature, in addition to the configuration of the sixteenth aspect, of further including a step of calculating a travel time in the link from road data and a set speed for storage instead of the travel time measured when the number of data representing the travel times of a plurality of the vehicles detected within the required time slot is lower than a specified number set in advance, in which the step of calculating the route connecting the set starting and destination locations is performed on the basis of the travel time data defined by the road data and the set speed.

With the method for the route calculation according to the seventeenth aspect, in setting the travel time, if the number of vehicles subjected to travel-time detection within the required time slot does not reach the specified number set in advance, the travel time is assumed by use of the known road data, i.e. the distance between the nodes, the width of a road, the number of lanes, kinds of road such as an expressway/ motorway or an ordinary road, speed limits, and so on, instead of the use of the travel time data obtained through the measurement. Then, in performing route calculation subject to the condition of the travel time in the navigation system, the route calculation is performed with reference to the assumed travel time.

Hence, the travel time can be set even if no vehicle passes within the time slot in which the measurement is performed. Further, if the number of vehicles passing is below the specified number, it is possible to perform the route calculation with excluding the influence of an extension of the travel time caused by individual circumstances, e.g. a failure, produced in the vehicles.

In this case, also, due to the smaller number of vehicles travelling in the time slot and the low possibility of a traffic jam occurring for example, there is no great difference from the actual travel time, resulting in route calculation matching actual conditions.

To attain the fourth object, a system for route calculation according to an eighteenth aspect of the present invention has the feature of including: vehicle-position detection means for receiving a position detection signal transmitted from a travelling vehicle to detect a vehicle position; node-passing-time detection means for sensing from the position detection of the vehicle-position detection means whether or not the vehicle passes a required node on a road network, to detect a node passing time of the vehicle; travel time calculation means for calculating a travel time in a link connecting the two required nodes from the node passing times when the vehicle passes the two required nodes on the road network which are detected by the node-passing-time detection means; travel-time data storage means for storing the data representing the travel time calculated by the travel time calculation means for each link on the road network; and route calculation means for calculating a route connecting a set starting location and a set destination on the basis of the travel time data stored in the travel-time data storage means.

On the system for the route calculation according to the eighteenth aspect, the vehicle-position detection means receives a position detection signal indicating the vehicle position which is transmitted via a mobile communication network from the travelling vehicle fitted with a navigation system or the like having communication facility. The node-passing-time detecting means monitors whether or not the vehicle subjected to the position detection passes each of the two nodes on the road network. Upon sensing that the vehicle has passed each of the two nodes on the road network, the node-passing-time detection means detects the passing times for storage. The travel-time calculation means calculates the time required to travel the link connecting the starting node and the end node from the detected times of passing the starting and end nodes, to set the calculated result as the travel time for the corresponding link.

Then, when calculating the route connecting the entered starting and destination locations in a minimum time for example, the route calculation means reads the stored travel time data for each of the links making up the road network for use as basic data in the route calculation.

As described above, according to the eighteenth aspect, the travel time regarding each of the links making up the road network is set based on the position detection signals transmitted from the vehicle which has actually traveled the link. For this reason, the route is calculated in conformity with the actual traffic situations, e.g. traffic congestion, as compared with route calculation with reference to the assumed travel time calculated from the road data of the distance and other factors.

Through the route calculation matching the actual conditions in this way, the effect of relieving traffic congestion is also to be expected.

To attain the fourth object, the system for the route calculation according to a nineteenth aspect of the present invention has the feature, in addition to the configuration of the eighteenth aspect, that the travel time calculation means calculates the travel time for each required time slot and stores it in the travel-time data storage means, and the route calculation means calculates the route connecting the set starting location and the set destination on the basis of the travel time data for the corresponding time slot read out from the travel-time data storage means.

With the system for the route calculation according to the nineteenth aspect, the travel time calculation means calculates the travel time in each of the links of the road network in separate given time slots, for example, the time slots of morning, afternoon and night or the time slots of the commuting hours in morning and evening and other time slots. The route calculating means performs the route calculation subject to the condition of the travel time with reference to the data of the travel time corresponding to the time slot in which the route to be set through this route calculation will be used.

Thus, a route more closely conforming to the actual traffic situations is set.

To attain the fourth object, the system for the route calculation according to a twentieth aspect of the present invention has the feature, in addition to the configuration of the nineteenth aspect, that the travel-time calculation means averages a plurality of data representing the travel times of the vehicles detected within the required time slot for the calculation of the travel time, and stores the averaged travel time data in the travel-time data storage means, and the route calculation means calculates the route connecting the set starting location and the set destination on the basis of the averaged travel time data for the corresponding time slot read out from the travel-time data storage means.

With the system for the route calculation according to the twentieth aspect, the travel time calculation means averages a plurality of travel times on the basis of the travel times detected from a plurality of vehicles which pass the link, subjected to measurement, within the required time slot, to set the travel time serving as a reference in the route calculation. The travel-time data storage means stores the averaged travel time data.

The route calculation means calculates the route connecting the set starting and destination locations with reference to the averaged travel time data for the corresponding time slot read from the travel-time data storage means.

Hence, comparing with the case in which a travel time detected from a single vehicle is set directly as a travel time for a link, adjustments are made for variations in the travel times caused by individual circumstances produced in the vehicles, resulting in route calculation more closely matching the actual traffic situations.

To attain the fourth object, the system for the route calculation according to a twenty-first aspect of the present invention has the feature, in addition to the configuration of the twentieth aspect, that the travel time calculation means calculates the travel time in the link from road data and a set speed instead of the measured travel time when the number of data representing the travel times of a plurality of the vehicles detected within the required time slot is lower than a specified number set in advance, and stores the calculated result in the travel-time data storage means, and the route calculating means calculates the route connecting the set starting location and the set destination location on the basis of the travel time data, defined by the road data and set speed, read out from the travel-time data storage means.

With the system for the route calculation according to the twenty-first aspect, when the travel time calculation means sets the travel time, if the number of vehicles subjected to the travel time detection does not reach the specified number set in advance, the travel time is assumed through a calculation using the known road data, i.e. the distance between the nodes, a width of the road, the number of lanes, kinds of road such as a expressway/motorway or an ordinary road, speed limits, and so on, instead of the use of the travel time data obtained through measurement. Then, when the route calculation means performs route calculation subject to the conditions of the travel time, the assumed travel time is used as the reference data.

Hence, the travel time can be set even if no vehicle travels through within the time slot in which the measurement is performed. Further, if the number of vehicles passing is below the specified number, it is possible to perform the route calculation excluding the influence of an extension of the travel time caused by individual circumstances, e.g. a failure, produced in the vehicles.

In this event, also, due to the lower number of vehicles travelling in the time slot and the low possibility of a traffic jam occurring for example, there is no great difference from the actual travel time, resulting in route calculation matching actual conditions.

To attain the fourth object, the system for the route calculation according to a twenty-second aspect of the present invention has the feature, in addition to the configuration of the eighteenth aspect, that the travel-time data storage means stores the calculated travel time data through an overwriting operation.

With the system for the route calculation according to the twenty-second aspect, the data of the travel times in the links making up the road network are updated to latest data at all times and are stored in the travel time data storing means, leading to the route calculation most closely matching the actual conditions.

These and other objects and features of the present invention will become more apparent from the following detailed description with reference to the accompanying drawings.

DETAILED DESCRIPTION OF THE PREFERRED EMBODIMENT

One of the preferred embodiments according to the present invention will be described hereinafter in detail with reference to the accompanying drawings.

A method and system for setting a travel time according to the present invention is applicable for use with a trafficinformation-providing service for indicating the time required to reach a destination, for example. The following description, however, will use an example where the present invention is applied to a communication navigation system in which information needed for navigation, such as map information, is provided from a navigation site, via the Internet, to a vehicle-mounted navigation system.

Figure 1:
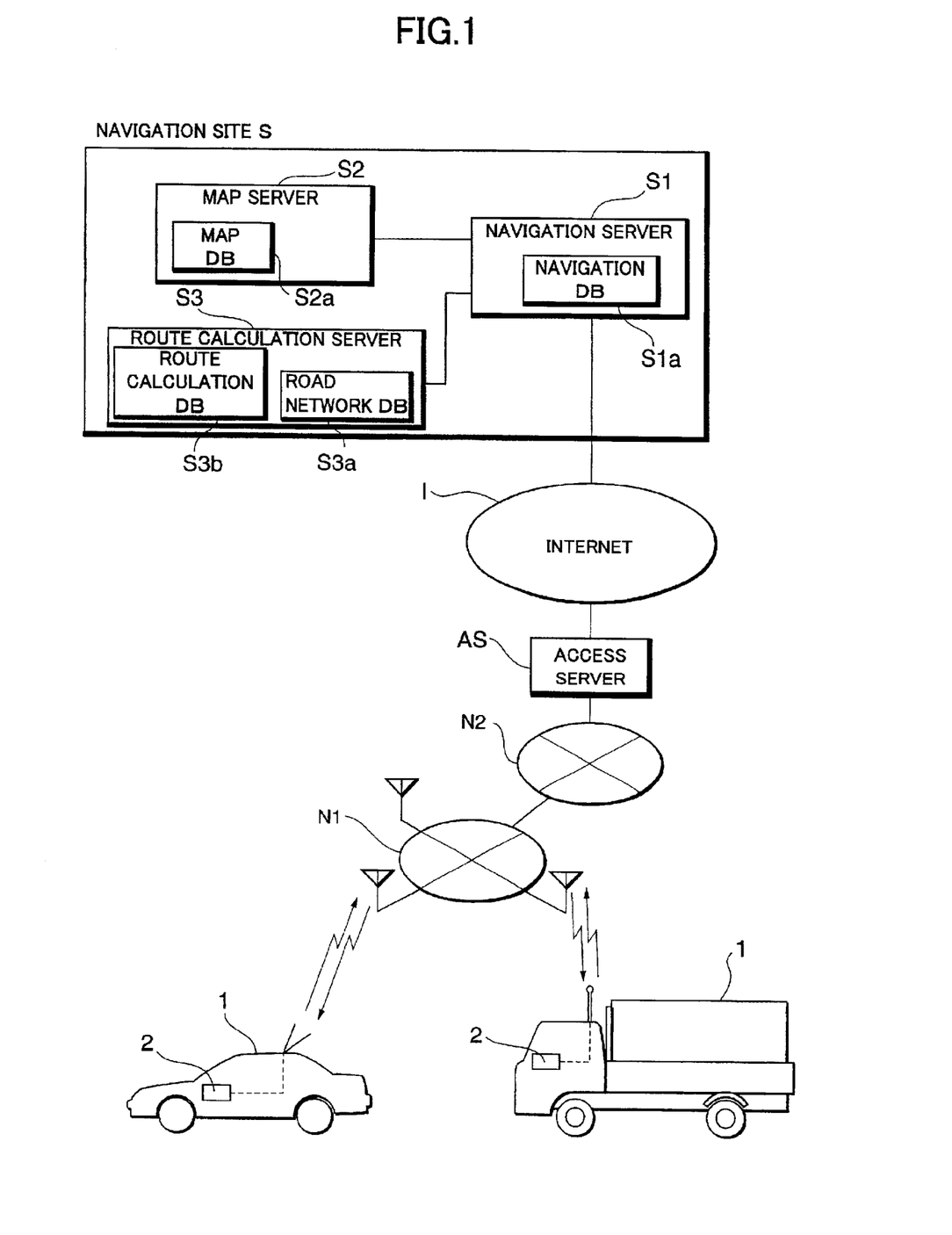
FIG. 1 is a system configuration diagram showing an example of an embodiment according to the present invention.

FIG. 1 is a system configuration diagram illustrating an example of the embodiment of a communication navigation system to which the present invention is applied.

Referring to FIG. 1, a navigation site S for providing navigation data to navigation systems is connected to the Internet I. A navigation system 2 mounted in a vehicle 1 which receives the navigation data from the navigation site S, is connected to the Internet I through a mobile communication network N1, a public switched phone network N2 and an access server AS, for accessing the navigation site S.

The navigation site S includes a navigation server S1 for providing a variety of navigation data such as guidance data and retrieval data which are accumulated in a navigation database S1a, and for exercising control of the communication of data between the navigation system 2 and the navigation site S which are connected through the Internet I; a map server S2 for providing map data accumulated in a map database S2a; and a route calculation server S3 for calculating a route based on a variety of data including travel time data for route calculation as described later which are accumulated in a road network database S3a and a route calculation database S3b.

The navigation server S1 has a program designed, upon an access from the navigation system 2 mounted in the vehicle 1 to the navigation server S through the Internet I, to receive a navigation setting input set in the navigation system 2 and to transmit a variety of guidance data such as data for displaying a guiding route and data for voice guidance and a variety of retrieval data for guidance which are accumulated in the navigation database S1a from the navigation database S1a to the navigation system 2; and a program designed to control the communication for supplying map data between the navigation system 2 and the map server S2, the communication of the route calculation data between the navigation system 2 and the route calculation server S3, and so on.

The map server S2 searches the map database S2a based on the display setting input entered into the navigation system 2, to read map data and data representing landmarks and the like on a map accumulated in the map database S2a, and transmits the read data to the navigation system 2 to allow it to display the read data on the display screen of the navigation system 2.

The route calculation server S3 calculates, on the basis of the route setting requirement entered into the navigation system 2, a route matching the entered route setting requirement from the road network data accumulated in the road network database S3a and the route calculation data accumulated in the route calculation database S3b, and transmits the calculation results to the navigation system 2 to allow the navigation system 2 to display the route for guidance on the display screen.

The route calculation database S3b of the route calculation server S3 includes a travel time data area for recording data representing the travel time between nodes on a road network which is used for performing a route calculation with reference to the travel time.

The travel time data to be recorded in the travel time data area is defined through the travel time measurement program installed into the route calculation server S3 as follows.

Figure 2:
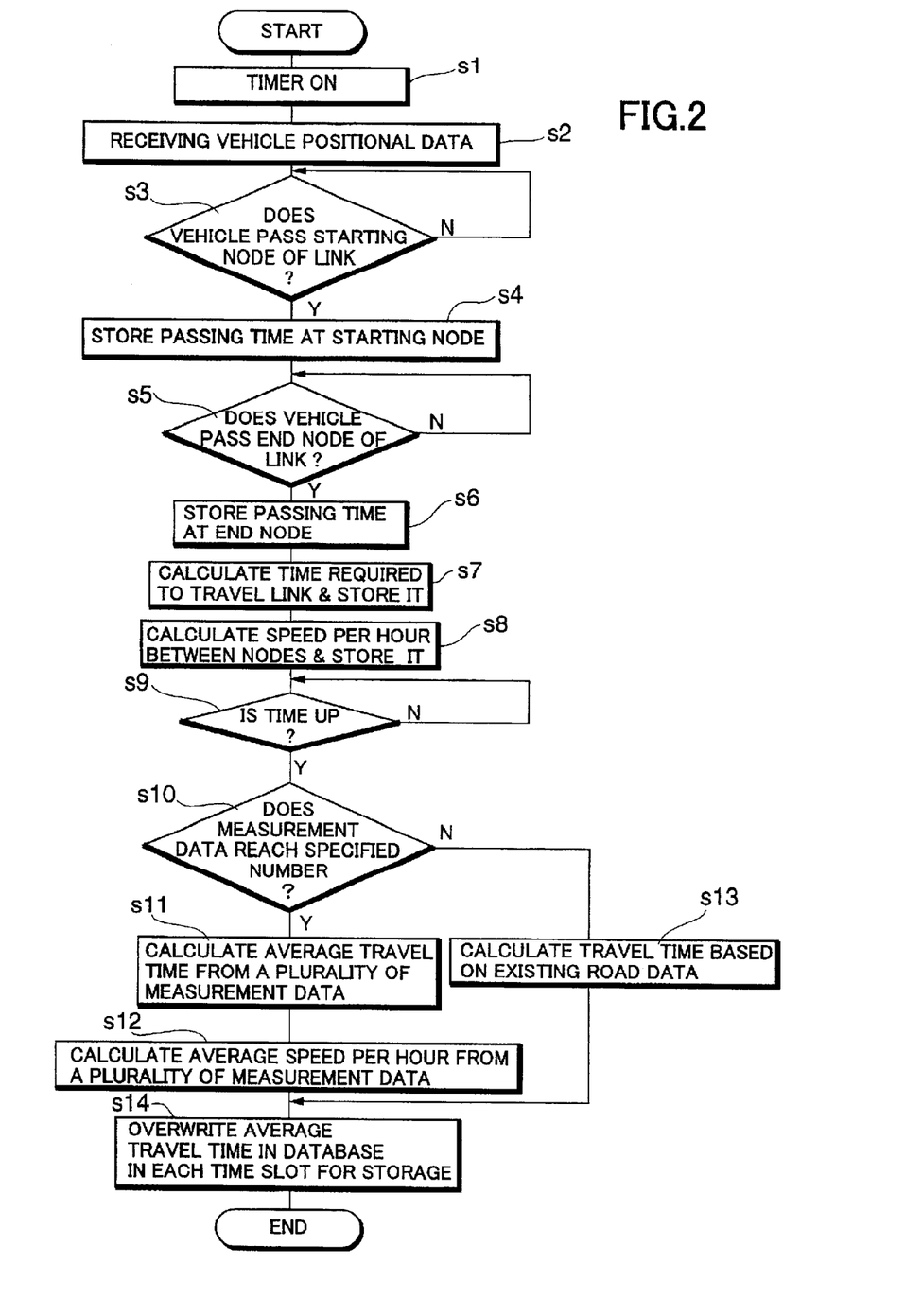
FIG. 2 is a flow chart illustrating steps for setting a travel time in the present invention.

FIG. 2 shows a flow chart illustrating steps of setting the travel time data to be recorded in the route calculation database S3b through the travel time measurement program in the route calculation server S3.

In FIG. 2, first, the route calculation server S3 sets a timer in each time slot in which a travel time is measured (step s1), to start the measurement of the travel time.

At step s1, the times are set in given time slots, for example, the time slots of morning, afternoon and night or the time slots of the commuting hours in morning and evening and other time slots. Setting a time slot to be shorter allows the measurement of the travel time in line with the actual traffic situations.

After step s1, the route calculation server S3 receives a detection signal of the position of a travelling vehicle detected by GPS (Global Positioning System) from the vehicle fitted with the navigation system 2 which is connected to the navigation site S through the mobile communication network N1, the public switched phone network N2, the access server AS and the Internet I (step s2).

Based on the received travel position detection signal, the server S3 monitors whether or not the vehicle passes a starting node on a given link, subjected to the measurement, on the road network (step s3).

Upon sensing that the vehicle has passed the starting node at step s3, the server S3 stores the passing time when the vehicle passes the starting node (step s4).

After that, the server S3 further monitors from the travel position detection signals continuously transmitted from the vehicle whether or not the vehicle passes an end node of the link to be measured (step s5). Upon sensing that the vehicle has passed the end node, the server S3 stores the passing time when the vehicle passes the end node (step s6).

The server S3 calculates the time required to travel the link subjected to measurement (the required travel time) from the times of respectively passing the starting and end nodes and stores the calculated result (step s7).

The server S3 further calculates speed per hour of the vehicle on the basis of the calculated required travel time and the distance of each link stored in advance in the route calculation database S3b, and stores the calculated result (step s8).

In this way, the server S3 performs the detection of the required travel time and the mean speed per hour on each of a plurality of vehicles which travel the link subjected to measurement within the time slot set by the timer (step s9). When the timer turns OFF, the server S3 determines whether or not the number of vehicles subjected to the detection of the required travel time and speed per hour within the time slot set by the timer reaches a specified number set in advance (step s10).

If the number of vehicles reaches the specified number, the server S3 calculates a average value of the required travel times from a plurality of time data representing the required travel times detected (step s11), then calculates a average value of the speed per hour from a plurality of speed data representing the speeds per hour of the vehicles subjected to the detection (step s12).

If the number of vehicles subjected to the detection of the required travel time and the speed per hour within the time slot set by the timer does not reach the specified number at step s10, the server S3 calculates the travel time based on known road data (the distance between nodes, the width of a road, the number of lanes, kinds of road such as a expressway/motorway or an ordinary road, speed limits, and so on) accumulated in advance in the route calculation database S3b (step s13).

Then, the server S3 records the calculated average required-travel-times and the calculated average speeds-per-hour as described above in the route calculation database S3b as the travel time for the link subjected to the measurement (step s14).

In step s14, when the sever S3 calculated the travel time by use of the known road data at step s13, the server S3 records the travel time calculated at step s13 and speed per hour used in the travel-time calculation in the route calculation database S3b as the travel time of the link subjected to the measurement.

The server S3 constantly measures the travel time between nodes on the road network as described above, and overwrites the travel time data stored in the route calculation database S3b whenever a time slot subjected to the measurement has elapsed, to update it to the latest travel time at all times.

While the vehicle-mounted navigation system 2 is connected via the Internet I to the navigation site S, a starting location and a destination for route calculation are entered into the navigation system 2, and further a required time is entered as the requirement for the route calculation. Then, the data representing the requirements for the route calculation is transmitted through the navigation server S1 of the navigation site S to the route calculation server S3.

The route calculation server S3 searches the travel time data, which are set by the aforementioned method and recorded in the route calculation database S3b, on the basis of the road network data accumulated in the road network database S3a, to calculate a route matching the requirements by use of a conventionally known route-calculation algorithm or the like.

Figure 3:
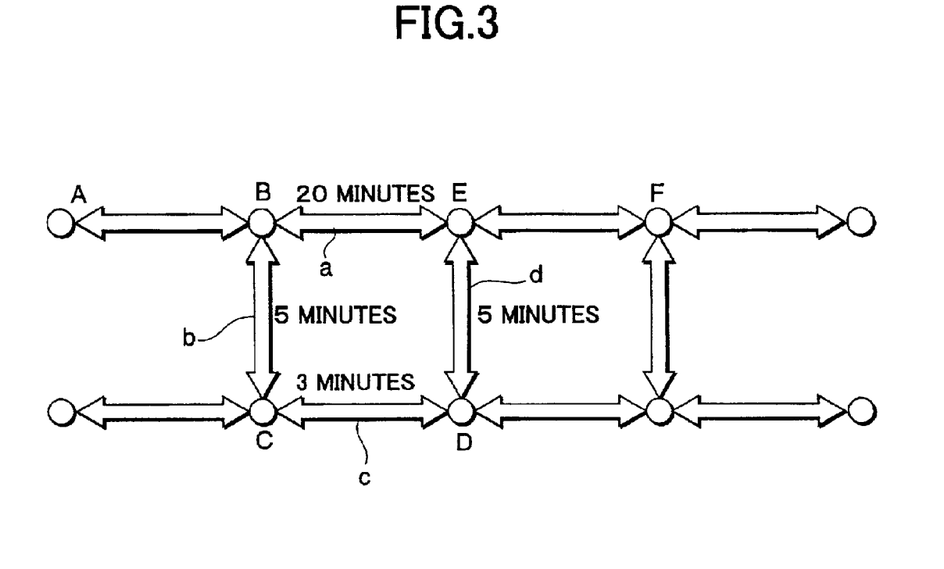
FIG. 3 is an explanatory diagram showing an example of a road network.

As illustrated in FIG. 3, for example, when route calculation is conducted on the requirements of travelling from a starting location node A to a destination node F in a minimum time, the shortest distance is the route from node A to node F by way of nodes B and E in that order. However, in a comparison between the data representing the travel time of a link a between nodes B and F in the travel time slot recorded in the route calculation database S3b and the data representing the sum of the travel times of a link b between nodes B and C, a link c between nodes C and D and a link d between the nodes D and E, the route by way of nodes C, D and E in that order has a shorter travel time. Accordingly, the route calculation server S3 selects the route from node A to node F by way of nodes B, C, D and E in that order, and transmits the resulting route calculation data together with the guidance data, read from the navigation database S1 of the navigation server S1, to the navigation system 2 to allow it to guide the vehicle 1 to the destination location.

The travel time data recorded in the route calculation database S3b and used in the route calculation are updated to the latest travelling data at all times, leading to route calculation in line with actual traffic situations when it is performed with reference to the travel time.

Further, in the measuring of the travel times, if there is a shortage of measurement data in a time slot in which the measurement is made, then the travel times are set based on the known road data. In such a case, however, the chances of, for example, a traffic jam occurring are remote because of a lower number of vehicle travelling in the time slot. Hence, there is no great difference from the actual required travel time, resulting in route calculation matching actual conditions.

Still further, route calculation conforming to actual traffic situations as described holds promise of the effects of relieving traffic congestion.

The terms and description used herein are set forth by way of illustration only and are not meant as limitations. Those skilled in the art will recognize that numerous variations are possible within the spirit and scope of the invention as defined in the following claims.

What is claimed is:

1. A method for setting a travel time, comprising the steps of:

receiving a position detection signal transmitted from a travelling vehicle to detect a position of the vehicle;

sensing whether or not the vehicle passes a starting node of a required link on a road network for storage of a passing time when the vehicle passes the starting node;

sensing whether or not the vehicle passes an end node of the required link on the road network for storage of a passing time when the vehicle passes the end node;

calculating a travel time for the link from the passing times at the starting node and the end node of the link, wherein said step of calculating the travel time is performed during at least one pre-set time slot and, in said step of calculating the travel time, the travel time is calculated by averaging a plurality of data representing the travel times of the vehicles detected within the at least one pre-set time slot; and calculating a travel time in the link from road data and a set speed instead of the travel time measured when the number of data representing the travel times of the vehicles detected within the at least one pre-set time slot is lower than a specified number set in advance.

2. The method for setting the travel time according to claim 1, further comprising a step of calculating an average speed per hour from the calculated travel time and the distance of the link.

3. The method for setting the travel time according to claim 1, further comprising a step of storing data representing the calculated travel time through an overwriting operation.

4. A system for setting a travel time, comprising:

vehicle-position detection means for receiving a position detection signal transmitted from a travelling vehicle to detect a vehicle position;

node-passing-time detection means for sensing from the position detection of said vehicle-position detection means whether or not the vehicle passes a required node on a road network, to detect a node passing time of the vehicle; and travel-time calculation means for calculating a travel time in a link connecting the two required nodes from the node passing times of the vehicle passing the two required nodes on the road network which are detected by said node-passing-time detection means, wherein said travel-time calculation means calculates the travel time during at least one pre-set time slot, averages a plurality of data representing the travel times of the vehicles detected within the at least one pre-set time slot for calculating the travel time, and calculates the travel time in the link from road data and a set speed instead of the detected node passage time when the number of data representing the travel times of a plurality of the vehicles detected within the at least one pre-set time slot is lower than a specified number set in advance.

5. The system for setting the travel time according to claim 4, further comprising speed-per-hour calculation means for calculating an average speed per hour from the travel time calculated by said travel-time calculation means and a distance of the link.

6. The system for setting the travel time according to claim 4, further comprising travel-time data storage means for storing data representing the travel time calculated by said travel-time calculation means.

7. The system for setting the travel time according to claim 6, wherein said travel-time data storing means stores the data representing the travel time through an overwriting operation.

8. A method for route calculation, comprising the steps of:
detecting node-passing times of a vehicle passing two required nodes on a road network on the basis of a vehicle positions detected by position detection signals transmitted from the travelling vehicle;
calculating a travel time in a link connecting the two nodes from the detected node-passing times for storing the calculated data for each link on the road network;
calculating a route connecting a set starting location and a set destination location on the basis of the stored travel time data, wherein said step of calculating the travel time is performed during at least one pre-set time slot and is calculated by averaging a plurality of data representing the travel time of the vehicle detected within the at least one pre-set time slot, and wherein said step of calculating the route connecting the set starting location and the set destination location is performed based on the averaged travel time data for the corresponding one pre-set time slot; and
calculating a travel time in the link from road data and a set speed from storage instead of the travel time measured when the number of data representing the travel times of a plurality of the vehicles detected within the at least one pre-set time slot is lower than a specified number set in advance, wherein said step of calculating the route connecting the set starting location and the set destination location is performed on the basis of the travel time data defined by the road data and the set speed.

9. A system for route calculation, comprising:
vehicle-position detection means for receiving a position detection signal transmitted from a travelling vehicle to detect a vehicle position;
node-passing-time detecting means for sensing from the position detection of said vehicle-position detection means whether or not the vehicle passes a required node on a road network, to detect a node passing time of the vehicle;
travel time calculation means for calculating a travel time in a link connecting the two required nodes from the node passing times when the vehicle passes the two required nodes on the road network which are detected by said node-passing-time detection means;
travel-time data storage means for storing the data representing the travel time calculated by said travel time calculation means for each link on the road network; and
route calculation means for calculating a route connecting a set starting location and a set destination on the basis of the travel time data stored in said travel-time data storage means,
wherein said travel time calculation means calculates the travel time during at least one pre-set time slot and stores it in said travel-time data storage means, averages a plurality of data representing the travel times of the vehicles detected within the at least pre-set time slot for calculation of the travel time and stores the averaged travel time in said travel-time data storage means, and calculates the travel time in the link from road data and a set speed instead of the measured travel time when the number of data representing the travel times of a plurality of the vehicles detected within the at least pre-set time slot is lower than a specified number set in advance and stores it in said travel time data storage means, and
said route calculation means calculates the route connecting the set starting location and the set destination based on the travel time data for the corresponding one pre-set time slot read out from the travel-time data storage means, calculates the route connecting the set starting location and the set destination location on the basis of the averaged travel time data for the corresponding one pre-set time slot read out from the travel-time data storage means, and calculates the route connecting the set starting location and the set destination location on the basis of the travel time data, defined by the road data and the set speed, read out from the travel-time data storage means.

10. The system for the route calculation according to claim 9, wherein said travel-time data storage means stores the calculated travel time data through an overwriting operation.

* * * * *